Sept. 6, 1966  D. E. LUPFER ETAL  3,271,270
CONTROL OF INTERNAL REFLUX IN A FRACTIONAL
DISTILLATION PROCESS AND SYSTEM
Filed Jan. 12, 1962  2 Sheets-Sheet 2

INVENTORS
D. E. LUPFER
M. L. JOHNSON
BY  *Young & Quigg*
ATTORNEYS

United States Patent Office 3,271,270
Patented Sept. 6, 1966

3,271,270
CONTROL OF INTERNAL REFLUX IN A FRACTIONAL DISTILLATION PROCESS AND SYSTEM
Dale E. Lupfer and Merion L. Johnson, Bartlesville, Okla., assignors to Phillips Petroleum Company, a corporation of Delaware
Filed Jan. 12, 1962, Ser. No. 165,965
4 Claims. (Cl. 202—160)

This invention relates to improved control systems wherein a desired process variable to be regulated is computed from measurements of process conditions. In another aspect it relates to improved process computers.

A number of automatic control systems have recently been developed which rely upon the computation of a desired value of a process variable from measurements of selected process conditions. One such control system, for example, is employed to manipulate the flow of external reflux to a fractionator in response to a computed value of internal reflux. Internal reflux comprises the external reflux returned to the column plus the vapor which is condensed near the top of the column by sub-cooled external reflux. The computation of internal reflux is made from measurements of the rate of flow of external reflux and the temperature differential between the vapors removed from the top of the column and the external reflux returned to the column. Another control system of this general type is employed to regulate the amount of heat added to the feed stream to a fractionation column in order to supply feed having a predetermined enthalpy. The amount of heat to be added to the feed stream is computed from measurements of the temperature of the feed, the rate of flow of the feed and the rate at which external heat is added to the feed. The rate of addition of external heat is then manipulated in response to the computed value.

While computers of this type have been quite helpful in improving the operation of fractionation systems, several problems have been encountered in some installations. In many industrial plants, flow rates are measured by sensing the pressure differential across an orifice in the flow conduit. This pressure differential is converted into a pneumatic signal which is transmitted to a recorder or computer. The recorder or computer normally is installed in a control house which may be located a substantial distance from the region at which the flow measurement is made. The transmission of pneumatic pressure signals any substantial distance inherently results in lags which can cause poor operation of the control system. In addition, the internal reflux computation previously described involves a multiplication which introduces a non-linear factor into the system. This can be a problem in some operations.

In accordance with the present invention, an improved computer is provided for use where the process variable to be controlled by the output signal from the computer is one of the measured values supplied to the computer. Instead of actually measuring the value to be regulated, the output signal from the computer is applied as an input thereto which is representative of such value. This constitutes a predictive control system. There are at least three reasons for using such a system. The undesirable effects of introducing transmission lags in a closed loop control system are avoided. This is applicable to pneumatic systems. It is also possible to avoid having a multiplier or divided in a closed loop. The presence of such an instrument causes the loop gain to change which results in poor control. Finally, better control is possible when one computer must be shared on a time basis by a number of processes. Sampled data systems normally degrade a closed loop control system in such a manner that the controller must be detuned to achieve stability. The predictive controller of this invention results in much better control.

Accordingly, it is an object of this invention to provide improved analog computers adapted for use in process control.

Another object is to provide improved control systems and methods for regulating process variables in response to measurements of process conditions.

Another object is to provide control systems wherein computed values of process conditions are utilized as input signals to computers contained in the systems.

Other objects, advantages and features of the invention should become apparent from the following detailed description, taken in conjunction with the accompanying drawing in which.

Figure 1:
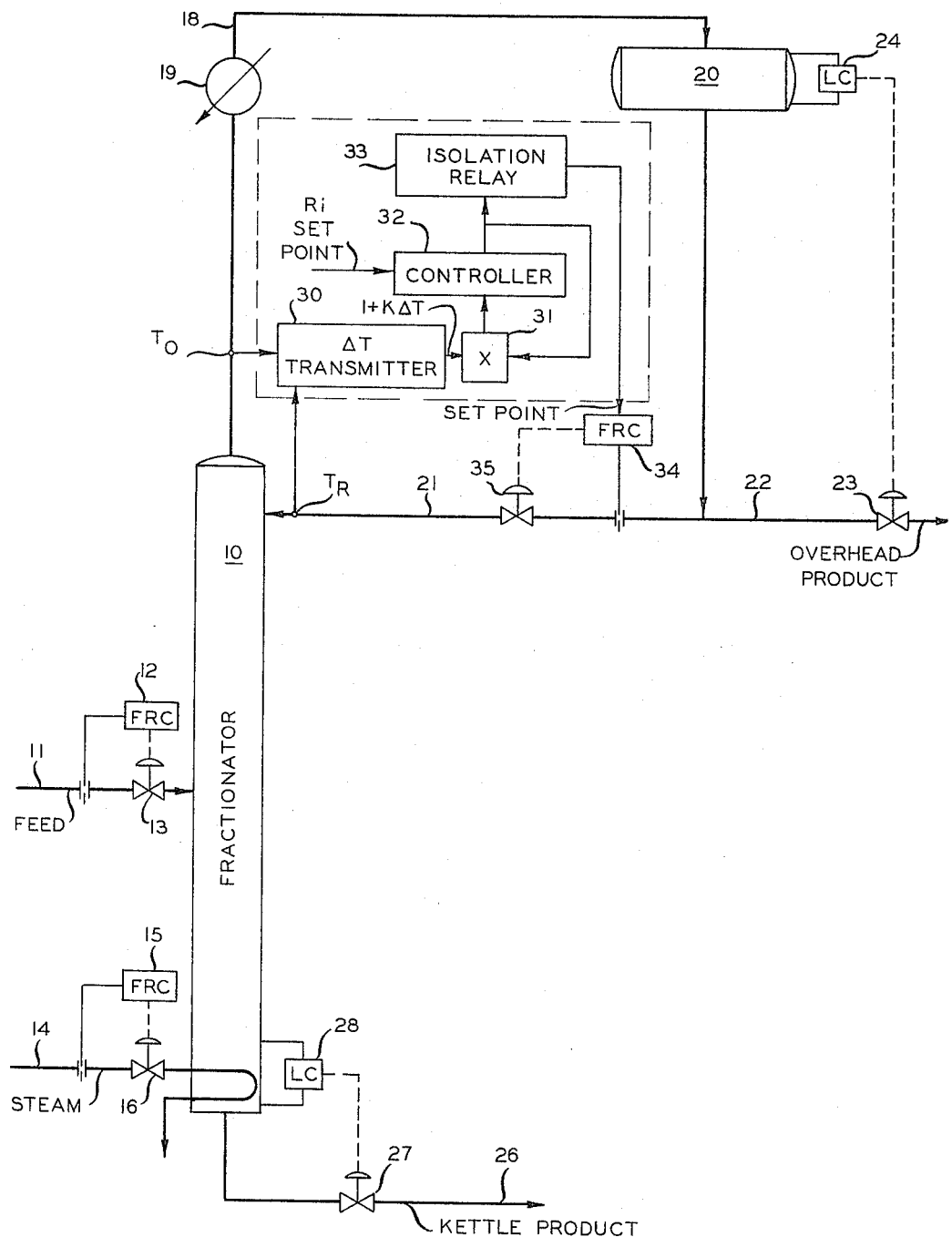
FIGURE 1 is a schematic representation of a fractionation system having one embodiment of the control system of this invention incorporated therein.

Referring now to the drawing in detail and to FIGURE 1 in particular, there is shown a conventional fractionation colume 10 which contains a number of vapor-liquid contacting trays. A feed mixture to be separated is introduced into column 10 through a conduit 11 at a predetermined rate which is maintained by a flow controller 12 that adjusts a valve 13. Steam, or other heating medium, is circulated through the lower region of column 10 through a conduit 14 at a predetermined rate which is maintained by a flow controller 15 that adjusts a valve 16. Vapors are withdrawn from the top of column 10 through a conduit 18 which has a condenser 19 therein. Conduit 18 communicates downstream from condenser 19 with an accumulator 20. A portion of the resulting condensate in accumulator 20 is returned to column 10 as external reflux through a conduit 21. The remainder of the condensate is removed as overhead product through a conduit 22 which has a control valve 23 therein. Valve 23 is adjusted by a liquid level controller 24 to maintain a predetermined liquid level in accumulator 20. A kettle product stream is withdrawn from the bottom of column 10 through a conduit 26 which has a control valve 27 therein. Valve 27 is adjusted by a liquid level controller 28 to maintain a predetermined liquid level in the bottom of column 10.

The control system employed in FIGURE 1 is adapted to maintain a predetermined flow of internal reflux in fractionator 10. This internal reflux $R_i$ can be computed from the following equation:

$$R_i = R(1 + K\Delta T)$$

where R is the rate of flow of external reflux, K is equal to $C_p/\lambda$, $C_p$ is the specific heat of the external reflux, $\lambda$ is the heat of vaporization of liquid on the top tray of column 10 and $\Delta T$ is the difference in temperature between the vapors removed from the top tray and the external reflux. It can thus be seen that measurements of the quantities $\Delta T$ and R provide sufficient information to compute the internal reflux since $C_p$ and $\lambda$ are substantially constant for any given separation.

The term $\Delta T$ is measured by comparing the temperature $T_O$ of the vapor removed from the top of column 10 with the temperature $T_R$ of the external reflux returned to column 10. This can be accomplished by the use of suitable temperautre sensing elements, such as thermocouples which are connected in opposition to one another. The signals from the temperature sensing elements are applied to the input of a $\Delta T$ transmitter 30 which is calibrated to provide an output signal representative of the quantity $1+K\Delta T$. A conventional temperature transmitter can be employed for this purpose. The constant 1 is added by adjustment of the zero point, and the constant K is provided by adjustment of the span. The output signal of transmitter 30 is applied to the first input of a multiplier 31. The second input of multiplier 31 is connected to the output of a controller 32. Multiplier 31 can advantageously be a pneumatic force bridge of the type described in U.S. Patent 2,643,055. The output signal from multiplier 31 is applied to the input of controller 32. The set point of controller 32 is adjusted in accordance with the desired value of the internal reflux to be maintained in column 10. The output signal of controller 32 is applied through an isolation relay 33 to adjust the set point of a conventional flow controller 34 which adjusts a control valve 35 in reflux conduit 21.

In internal reflux computing systems previously employed, the quantity R was actually transmitted to multiplier 31 from a flow sensing device such as the orifice associated with flow controller 34 in conduit 21. In the system illustrated in FIGURE 1, the output signal of controller 32 is employed directly as one input to multiplier 31. This is possible because the output signal which adjusts the flow of external reflux (R) is actually representative of the rate of flow of external reflux. This eliminates the need for a pneumatic transmission line between conduit 21 and the internal reflux computer. The elimination of such a transmission line, which often must be quite long, reduces lags in the system and provides tighter control.

Figure 2:
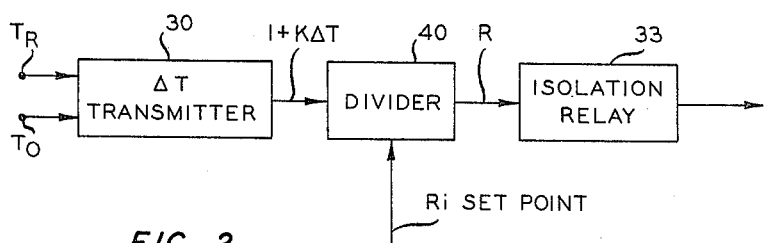
FIGURE 2 is a schematic representation of a second embodiment of the computer of this invention.

A second embodiment of the internal reflux computer which has the advantage of eliminating both the transmission lag and non-linearity element in the closed-loop control system is illustrated in FIGURE 2. The output signal from transmitter 30 is applied to one input of a signal divider 40. The second input to divider 40 is a set point signal representative of the desired value $R_i$ of internal reflux. Divider 40 can advantageously be a pneumatic force bridge of the type described in U.S. Patent 2,643,055. The output signal of divider 40 is applied through isolation relay 33 to flow controller 34, not shown in FIGURE 2. The computer of FIGURE 2 actually predicts the value of external reflux required to give the desired internal reflux. The internal reflux equation can be rewritten as follows:

$$R = \frac{R_i}{(1+K\Delta T)}$$

The desired value of $R_i$ is supplied as one input to divider 40 and is divided by the quantity $1+K\Delta T$ from transmitter 30. As the measured value of $\Delta T$ changes, the output signal R is changed to maintain the internal reflux constant within column 10. The computer of FIGURE 2 has the additional advantage of eliminating a non-linear element from a closed-loop control system.

Figure 3:
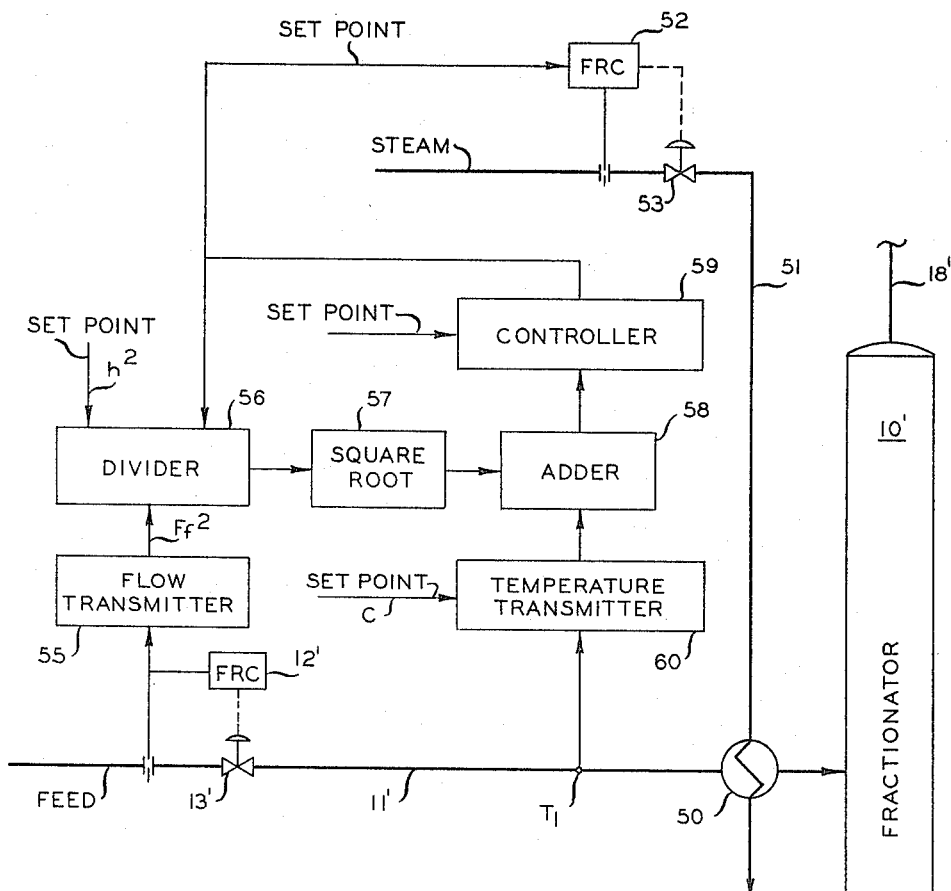
FIGURE 3 is a schematic representation of a second embodiment of the control system of this invention.

A third embodiment of the control system of this invention is illustrated schematically in FIGURE 3. Elements of FIGURE 3 which correspond to those of FIGURE 1 are designated by like primed reference numerals. The control system of FIGURE 3 is adapted to regulate the enthalpy of the feed introduced into column 10' through conduit 11'. Conduit 11' passes through a heat exchanger 50 which is positioned near the point at which the feed is introduced into column 10'. Steam, or other heating medium, is passed through heat exchanger 50 by means of a conduit 51. The rate of flow of steam through conduit 51 is regulated by a flow controller 52 which adjusts a valve 53 in conduit 51. The total enthalpy H of feed supplied to column 10' can be computed from the following equation:

$$H = C(T_1 - T) + \frac{F_s}{F_t} h$$

where C is the average specific heat of the feed, $T_1$ is the temperature of the feed upstream from heat exchanger 50, T is a reference temperature, $F_s$ is the rate of flow of steam through conduit 51, $F_t$ is the rate of flow of feed and $h$ is the difference in enthalpy of the steam entering heat exchanger 50 and the condensate removed therefrom.

A flow transmitter 55 is connected to the orifice which is associated with flow controller 12'. This flow transmitter provides an output signal $F_t^2$ which is representative of the square of the rate of flow of feed through conduit 11'. The output signal of flow transmitter 55 is applied to one input of a divider 56. The second input to divider 56 is the output signal of a controller 59. As described in more detail hereinafter, this signal is representative of the rate of flow of steam through conduit 51. Divider 56 thus provides an output signal representative of the quantity $F_s^2/F_t^2$. A signal representative of the quantity $h^2$ is applied to the set point of divider 56. This adjusts the gain of the divider such that the quotient therefrom is effectively multiplied by this set point value $h^2$. The output signal from divider 56 is transmitted through a square root device 57 to the input of an adder 58. A temperature sensing device $T_1$ transmits a signal representative of the temperature of the feed upstream from heat exchanger 50 to a temperature transmitter 60. A signal representative of the quantity C is applied to the set point of transmitter 60 such that the output signal of the temperature transmitter is representative of the quantity $C(T_1-T)$, where T is an arbitrary reference value. This signal is applied to the second input of adder 58. The output signal of adder 58 is applied to a controller 59 which in turn adjusts the set point of flow controller 52. A signal representative of the desired value of the enthalpy of the feed supplied to fractionator 10' is applied to the set point of controller 59.

In prior control systems of this type, a signal representative of the measured rate of flow of steam through conduit 51 is transmitted to a divider 56. In accordance with the present invention, the need for transmitting such a signal to divider 56 is eliminated by transmitting the output signal of controller 59 directedly to the divider. Since flow controller 52 receives a signal from the orifice associated therewith which is representative of the square of the flow rate of steam, the set point signal applied from controller 59 must necessarily be representative of the square of the flow rate of steam. Accordingly, this signal can be applied to the input of divider 56 instead of the actual measured pressure differential across the orifice. If the computer is located a substantial distance from the orifice in the steam line, the elimination of the pnuematic transmission line increases the accuracy of the control system.

In view of the foregoing description, it should be evident that improved control systems are provided in accordance with this invention which eliminate lags that are inherent in systems known heretofore. This is accomplished by employing the output signal of a computing element as one of the input signals to the computer instead of a measured value. A predictive type of control system is also provided in accordance with this invention which eliminates non-linear elements from conventional closed-loop control systems. It should be apparent that the individual elements of the computers can be conventional equipment known in the art. While pneumatic elements normally are employed because of their low cost, electrical computing elements can be used to advantage.

While the invention has been described in conjunction with presently preferred embodiments, it should be evident that it is not limited thereto.

What is claimed is:

1. In a fractionation system that includes a fractionation column, means to introduce a feed mixture to be separated into said column, first conduit means connected to said column to remove a vapor stream from the upper region of said column, cooling means connected to said first conduit means to condense at least a portion of the vapor stream removed from said column, and second conduit means connected between said first conduit means and said column to return a portion of the resulting condensate to said column as external reflux, a control system comprising first temperature sensing means positioned to sense the temperature $T_O$ of said vapor removed from said column; second temperature sensing means positioned to sense the temperature $T_R$ of said condensate returned to said column as external reflux; means responsive to said first and second temperature sensing means to establish a first signal representative of $1+K\Delta T$, where K is a constant equal to the specific heat of said external reflux divided by the heat of vaporization of liquid in the top of said column and $\Delta T$ is $T_O-T_R$; signal multiplying means having first and second inputs and an output; means to apply said first signal to said first input; controller means having a signal input and a set point input with the signal applied to said set point input being representative of the desired value of internal reflux; means connecting said output of said multiplying means to said signal input of said controller means, said controller means being adapted to compare the signal applied to its set point input with the signal applied to its signal input and produce responsive to such comparison an output signal representative of the value of external reflux necessary to maintain the internal reflux substantially equal to said desired value; means independent of the actual flow of external reflux to apply the output signal of said controller means to said second input of said multiplying means; and means responsive to said output signal of said controller means to regulate the rate of flow of said external reflux through said second conduit means.

2. The control system of claim 1 wherein said temperature sensing means provide electrical output signals; said means to establish said first signal is a transducing means which provides a pneumatic signal; said multiplying means is a pneumatic multiplier; said controller means is a pneumatic controller; and said means to apply the output signal of said controller means to said second input comprises a pneumatic isolation relay.

3. In a fractionation system that includes a fractionation column, means to introduce a feed mixture to be separated into said column, first conduct means connected to said column to remove a vapor stream from the upper region of said column, cooling means connected to said first conduit means to condense at least a portion of the vapor stream removed from said column, and second conduit means connected between said first conduit means and said column to return a portion of the resulting condensate to said column as external reflux; a control system comprising first temperature sensing means positioned to sense the temperature $T_O$ of said vapor removed from said column; second temperature sensing means positioned to sense the temperature $T_R$ of said condensate returned to said column as external reflux; means responsive to said first and second tempertaure sensing means to establish a first signal representative of $1+K\Delta T$, where K is a constant equal to the specific heat of said external reflux divided by the heat of vaporization of liquid in the top of said column and $\Delta T$ is $T_O-T_R$; signal dividing means having first and second inputs and an output; means to apply a signal of preselected magnitude to one of said inputs of said dividing means as the dividend, said signal of preselected magnitude representing the desired rate of internal reflux flow within said column; means to apply said first signal to said second input of said dividing means as the divisor; and means responsive to the output signal of said dividing means, which represents the quotient of said signal of preselected magnitude divided by said first signal, to regulate the rate of flow of said external reflux through said second conduit means.

4. The control system of claim 3 wherein said temperature sensing means provide electrical output signals; said means to establish said first signal is a transducing means which provides a pneumatic signal; said dividing means is a pneumatic divider; and said means to regulate includes a pneumatic isolation relay.

References Cited by the Examiner

UNITED STATES PATENTS

| | | | |
|---|---|---|---|
| 2,006,035 | 6/1935 | Stewart | 236—23 |
| 2,572,253 | 10/1951 | Fellows et al. | 236—23 |
| 2,842,311 | 7/1958 | Petrie | 235—151 |
| 3,011,709 | 12/1961 | Jacoby | 235—151 |
| 3,018,229 | 1/1962 | Morgan | 202—40 |
| 3,020,213 | 2/1962 | Lupfer | 202—160 |
| 3,050,450 | 8/1962 | Kleiss et al. | 202—160 |
| 3,158,556 | 11/1964 | Hopper | 196—132 X |

NORMAN YUDKOFF, *Primary Examiner.*

GEORGE D. MITCHELL, *Examiner.*

W. L. BASCOMB, M. H. SILVERSTEIN,
*Assistant Examiners.*